(12) United States Patent
Bräbander et al.

(10) Patent No.: US 9,512,824 B2
(45) Date of Patent: Dec. 6, 2016

(54) MOUNTING SYSTEM

(71) Applicant: Hydac Accessories GmbH, Sulzbach/Saar (DE)

(72) Inventors: Wolfgang Bräbander, Homburg (DE); Jochen Caspari, St. Wendel (DE); Rainer Even, Saarbrücken (DE); Burhan Yagci, Sulzbach (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 41 days.

(21) Appl. No.: 13/261,932

(22) PCT Filed: Jan. 23, 2013

(86) PCT No.: PCT/EP2013/000194
§ 371 (c)(1),
(2) Date: Jul. 18, 2014

(87) PCT Pub. No.: WO2013/110454
PCT Pub. Date: Aug. 1, 2013

(65) Prior Publication Data
US 2015/0001354 A1    Jan. 1, 2015

(30) Foreign Application Priority Data

Jan. 25, 2012 (DE) ......................... 10 2012 001 408

(51) Int. Cl.
*F03D 11/00* (2006.01)
*F16L 3/22* (2006.01)
(Continued)

(52) U.S. Cl.
CPC .............. *F03D 80/85* (2016.05); *F03D 80/00* (2016.05); *F16L 3/22* (2013.01); *H02G 3/0462* (2013.01);
(Continued)

(58) Field of Classification Search
CPC ...... F03D 11/0066; F03D 80/80; F03D 80/85; H02G 3/0462; H02G 3/32; H02G 3/30; F16L 3/22
(Continued)

(56) References Cited

U.S. PATENT DOCUMENTS 3,476,868 A * 11/1969 Williams .................. H02G 7/12
174/146
4,117,259 A * 9/1978 Giebel ................. G02B 6/4445
174/78
(Continued)

FOREIGN PATENT DOCUMENTS

DE    EP 1344968 A2 *  9/2003 ............ F16L 3/2235
DE    EP 2251579 A1 * 11/2010 ......... F01N 13/1822
(Continued)

*Primary Examiner* — Eret McNichols
(74) *Attorney, Agent, or Firm* — Wenderoth, Lind & Ponack, L.L.P.

(57) ABSTRACT

A mounting system for strand-shaped functional elements (5) such as cables or lines, particularly for wind power plants, has a main body (1) having strand passageways (3) formed by receiving spaces (7) with openings (13) for inserting functional elements (5). The openings are closable by a cover devices (49, 43). The spaces define receiving axes (15) extending from the outer opening (13) to the inner end (17) of the receiving spaces (7). The main body (1) is formed from at least two sector elements (11, 12) each having at least one strand passageway (3) and coupleable to one another at at least one connecting point (21). The receiving axes (15) of successive strand passageways (3) on the main body (1) diverge outwardly.

20 Claims, 5 Drawing Sheets

(51) Int. Cl.
*H02G 3/30* (2006.01)
*H02G 3/32* (2006.01)
*H02G 3/04* (2006.01)

(52) U.S. Cl.
CPC .............. *H02G 3/30* (2013.01); *H02G 3/32* (2013.01); *Y02E 10/722* (2013.01)

(58) Field of Classification Search
USPC ........................................................ 174/100
See application file for complete search history.

(56) References Cited

U.S. PATENT DOCUMENTS

| | | | | |
|---|---|---|---|---|
| 4,456,058 A * | 6/1984 | Powell | ................... | F28F 9/013 138/112 |
| 4,550,690 A | 11/1985 | Baugher | | |
| 4,804,020 A * | 2/1989 | Bartholomew | ......... | B29C 65/58 138/111 |
| 5,257,768 A | 11/1993 | Juenemann et al. | | |
| 5,758,004 A * | 5/1998 | Alarcon | ............... | G02B 6/4471 174/93 |
| 5,792,991 A * | 8/1998 | Nolf | ..................... | H02G 15/013 174/138 G |
| 6,248,953 B1 * | 6/2001 | Miller | ................... | H02G 15/013 174/74 R |
| 6,561,466 B1 | 5/2003 | Myers | | |
| 6,622,585 B1 * | 9/2003 | Salomonsson | ....... | B25J 19/0029 248/68.1 |
| 6,639,152 B2 * | 10/2003 | Glew | ................... | G02B 6/4435 174/113 C |
| 6,710,249 B1 * | 3/2004 | Denton | ................ | H01B 7/0045 16/2.2 |
| 6,802,512 B2 * | 10/2004 | Muller | ................. | H02G 15/013 174/653 |
| 7,015,394 B2 * | 3/2006 | Desard | ................ | H02G 15/013 174/100 |
| 7,288,720 B1 * | 10/2007 | Moyher | ................. | H01R 4/646 174/78 |
| 7,518,058 B1 * | 4/2009 | Hagbrandt | ............... | H02G 3/02 174/113 C |
| 8,020,259 B2 * | 9/2011 | Ho | ......................... | F16L 3/222 24/129 R |
| 8,590,847 B2 * | 11/2013 | Guthke | ................... | H02G 3/32 174/68.1 |
| 9,127,789 B2 * | 9/2015 | Caspari | ............... | F03D 11/0066 |
| 2002/0012582 A1 * | 1/2002 | Kirkegaard | ......... | F03D 11/0066 415/4.3 |
| 2004/0080119 A1 * | 4/2004 | Goll | .......................... | F16L 5/08 277/607 |
| 2004/0256138 A1 * | 12/2004 | Grubish | ............... | G02B 6/4442 174/93 |
| 2005/0263316 A1 * | 12/2005 | Matsumoto | ............... | H02G 3/32 174/113 R |
| 2007/0007397 A1 * | 1/2007 | Nelson | ................... | F16L 3/2235 248/68.1 |
| 2007/0079969 A1 * | 4/2007 | Allenworth | ......... | E21B 17/1035 166/368 |
| 2007/0120023 A1 * | 5/2007 | Martinez | ............... | E02F 9/2275 248/75 |
| 2009/0272576 A1 * | 11/2009 | Medina | .................... | H02G 3/30 174/72 A |
| 2009/0309313 A1 * | 12/2009 | Knorr | .................. | G02B 6/4444 277/626 |
| 2012/0028511 A1 * | 2/2012 | Even | ................... | F03D 11/0066 439/796 |
| 2012/0133144 A1 * | 5/2012 | Barton | ................ | F03D 11/0066 290/55 |
| 2013/0233597 A1 * | 9/2013 | Suiter | ....................... | H02G 1/00 174/135 |
| 2014/0217741 A1 * | 8/2014 | Christensen | ........ | F03D 11/0066 290/55 |
| 2014/0332249 A1 * | 11/2014 | Barna | ...................... | H02G 3/32 174/68.3 |

FOREIGN PATENT DOCUMENTS

| | | | | |
|---|---|---|---|---|
| DE | 10 2011 076 940 A1 | 12/2011 | | |
| DE | 10 2010 032 687 A1 | 2/2012 | | |
| DE | 10 2011 012 391 A1 | 8/2012 | | |
| DE | 10 2011 116 948 | 4/2013 | | |
| DE | 102011116948 B3 * | 4/2013 | .............. | F16L 3/137 |
| DE | 10 2012 013 615 | 9/2013 | | |
| DE | 102012013615 B3 * | 9/2013 | .......... | F03D 11/0066 |
| DE | 10 2012 019 490 | 4/2014 | | |
| DE | 10 2012 019 493 | 4/2014 | | |
| DE | 102012019490 A1 * | 4/2014 | .......... | F03D 11/0066 |
| DE | 102012019493 A1 * | 4/2014 | .......... | F03D 11/0066 |
| DE | 10 2013 011 245 | 1/2015 | | |
| DE | 102013011245 A1 * | 1/2015 | .......... | F03D 11/0066 |
| EP | 0 446 683 A2 | 9/1991 | | |
| GB | 2466919 A | 7/2010 | | |
| WO | WO 00/79660 A1 | 12/2000 | | |

\* cited by examiner

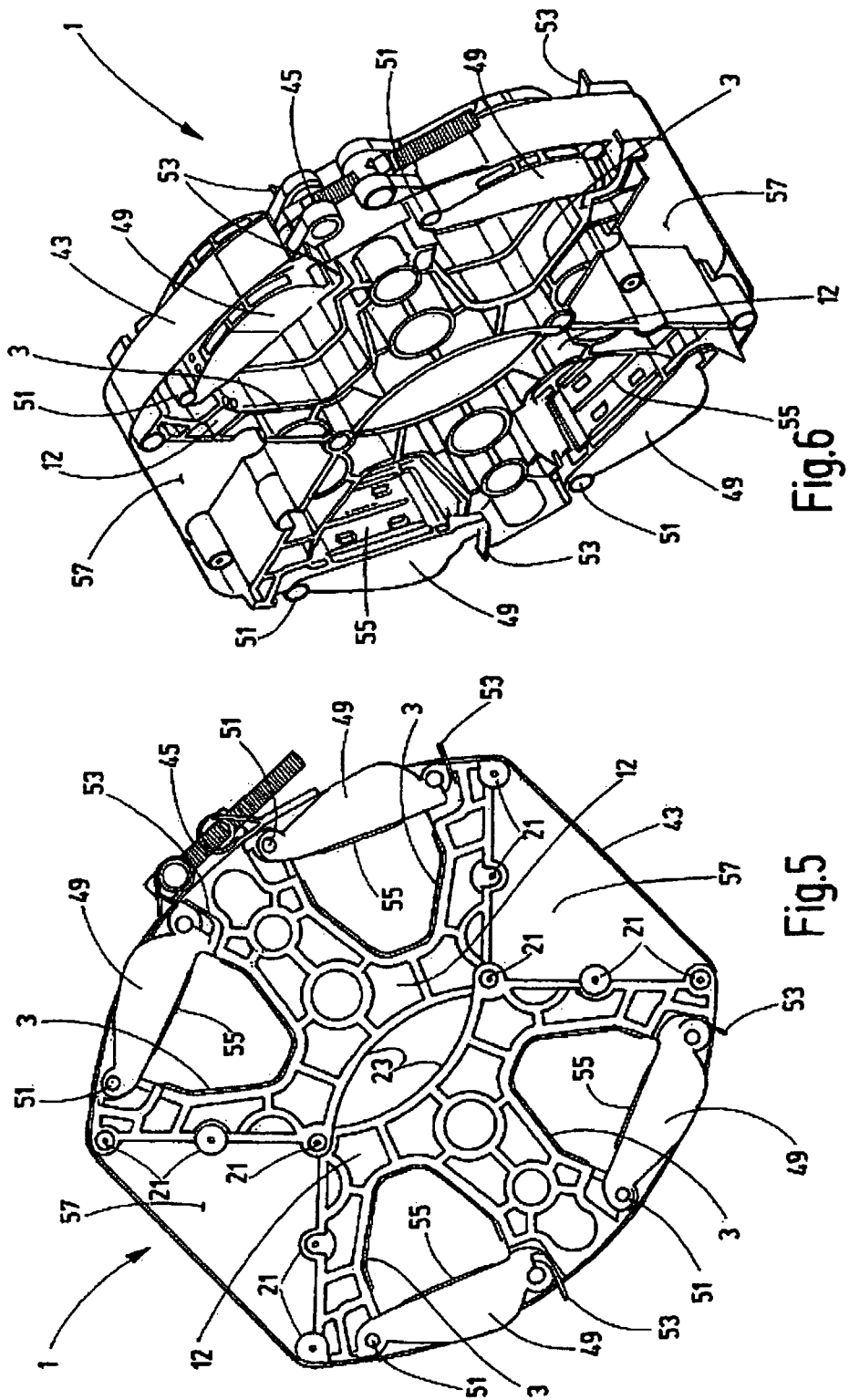

MOUNTING SYSTEM

FIELD OF THE INVENTION

The invention relates to a mounting system for strand-shaped functional elements such as cables or lines, in particular for wind power plants. The mounting system has a main body having strand passageways formed by receiving spaces, which spaces have openings for the insertion of functional elements that can be closed by cover devices. Each receiving space defines a receiving axis extending from the outer opening to the inner end of the respective receiving space.

BACKGROUND OF THE INVENTION

In conventional wind power plants, the nacelle rotatably disposed on the tower contains the generator units having the corresponding assemblies and can perform up to three turns before the nacelle is driven back. Strand-shaped operational functional elements, such as cables for the removal of generated energy as well as for control, condition monitoring, communication and the like, as well as hose lines etc., extend through the tower into nacelle and must therefore be positioned in an orderly manner and fixed, in particular in the region hanging out of the nacelle into the tower. To ensure operational reliability, cables and the like in the loops hanging in the tower must be kept at a distance such that they do not rub against one another during rotational movements. In the case of the large number of strand-like functional elements used in modern wind power plants, which functional elements must be accommodated in the strand passageways of a corresponding main body, that main body must have significant dimensions. This requirement regularly results in high manufacturing costs for the manufacturing processes under consideration, such as compression or injection molding of plastics or metal alloys, when manufacturing components of such a large size.

SUMMARY OF THE INVENTION

Given these difficulties, an object of the invention is to provide an improved mounting system of the type under consideration, which enables low-cost manufacturing.

This object is basically achieved according to the invention by a mounting system having a main body formed from at least two sectional elements, which each have strand passageways and which can be coupled to one another at at least one junction point. The receiving axes of successive strand passageways on the main body diverge outward. Because a main body is provided, which is made up of sectional elements, the need to manufacture the main body in the form of a component having large dimensions is eliminated, which in the prior art, make a large tool and correspondingly large injection molding machine necessary. Instead, the use of smaller machine units simplifies and lowers the cost of production. Due to the fact that in addition, the receiving axes of successive strand passageways on the main body diverge outward, the main body has a curved outer form, which form is more favorable for the formation of strand bundles such as those that hang out of the nacelle into the tower, as compared to conventional mounting systems having flat, strip-like main bodies.

In particular, the main body may advantageously have the form of a star-shaped body, on which strand passageways are disposed along an imaginary curved line.

In the case of such a body having curved peripheral regions, the cover device, which closes the openings of the receiving spaces of the strand passageways, may advantageously also have a tension band as an additional element. The tension band encloses the strand member and forms a safeguard against short-circuit forces that may possibly arise during operation.

For the configuration of the star-shaped body, at least two of the sectional elements can be identically formed. For example, the entire star-shaped body is made up of two sectional elements designed as interchangeable parts.

Alternatively, a star-shaped body formed out of more than two sectional elements may be provided, in which all sectional elements are identically formed.

In terms of the coupling of the sectional elements, at least one attachment point of the sectional elements can be formed as a hinge joint that makes a relative pivotal movement of the sectional elements possible. To form the main body, sectional elements or groups of sectional elements connected to one another can be folded out such that an additional, central receiving space located in the interior of the strand member is created therebetween, in which an additional functional element can be installed.

The strand passageways of the sectional elements may advantageously have receiving spaces in the form of trough-like recesses. The cover device has holding members, which can be latched by the appropriate sectional element for the pre-fixation of functional elements that are inserted into the strand passageways at the opening of the respective receiving spaces. This arrangement facilitates the assembly process in that functional elements can be comfortably inserted into the strand passageways in succession and secured there against falling out before the fixing process is finally completed, for example, by the tension band enclosing the holding members.

In especially advantageous embodiments, the sectional elements are in the form of quadrants, which can be combined to form a star-shaped body in which the openings of the receiving spaces are located in a circular line that extends along the outer periphery of the star-shaped body. The inner faces of the receiving spaces facing away from the opening of the strand passageways may be delimited by a wall, which extends along a quarter-circle so that the walls delimit a central opening. The central opening forms a receiving space for the installation of an additional functional element.

The arrangement may be advantageously made such that an inner insert may be provided that can be accommodated in the central opening for the formation of an additional strand passageway. The inner insert forms at least one additional strand passageway, or one or a plurality of further additional strand passageways.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 5 is a side view of a mounting system according to a second exemplary embodiment of the invention, without strand-like functional elements inserted into the strand passageways;

FIG. 6 is a perspective side view of the mounting system of FIG. 5;

DETAILED DESCRIPTION OF THE INVENTION

Figure 1:
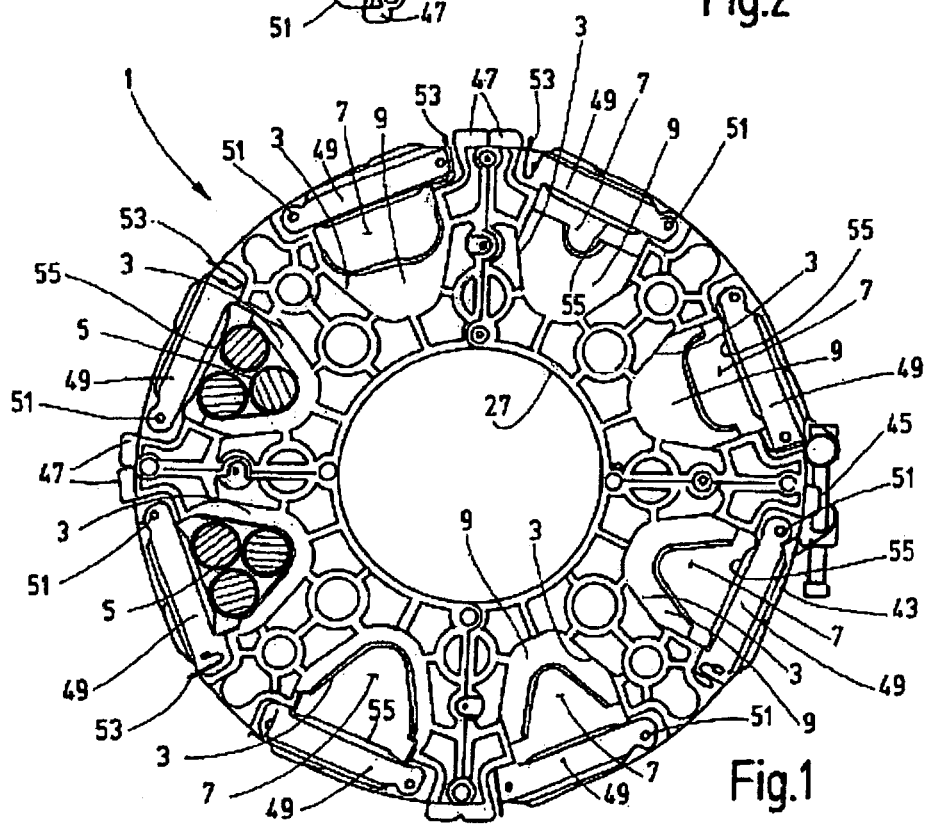
FIG. 1 is a side view of a mounting system according to a first exemplary embodiment of the invention, wherein a bundle of three cables is inserted into each of two strand passageways.

FIG. 1 shows a first embodiment of the invention as a whole, where a main body in the form of a star-shaped body 1 is provided. Along the peripheral regions of body 1 strand passageways 3 in the form of trough-like recesses are formed, in which strand-shaped functional elements 5 that are to be fastened can be inserted. By way of example, FIG. 1 only shows functional elements inserted into two strand passageways 3, which elements each comprise a cable bundle 5 comprising three cables. The cable bundles are inserted into the receiving space 7 formed in the strand passageways 3. As made clear in FIG. 1, adapter inserts 9 are inserted into some of the strand passageways 3 to facilitate the fixing of functional elements having different shapes and dimensions, in that the shape and dimension of the respective receiving space 7 is adapted to the requirements.

Figure 2:
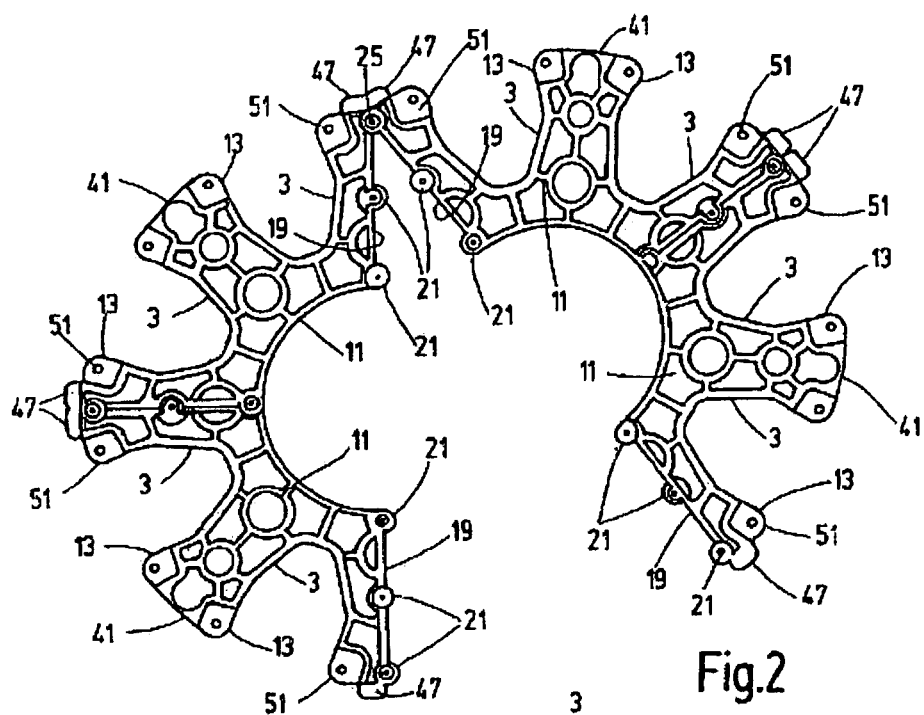
FIG. 2 is a partial side view of the mounting system of FIG. 1, wherein four quadrants forming the main body as a star-shaped body are combined into a pair of sectional elements, shown unfolded at a hinged articulation point.
Figure 3:
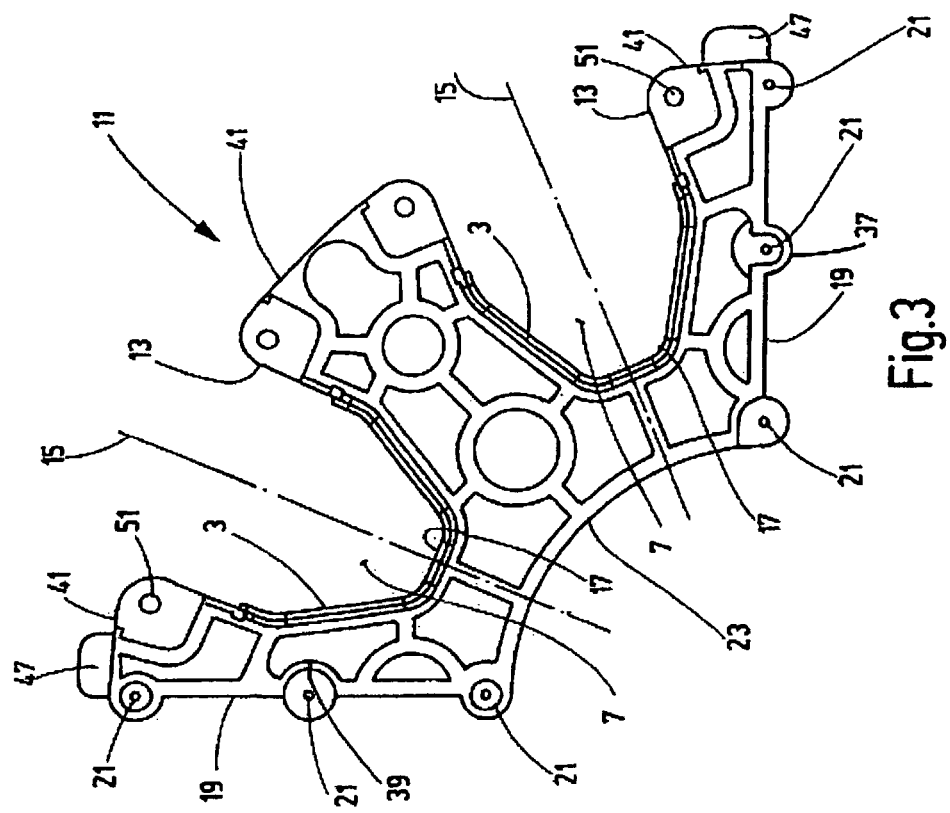
FIG. 3 is a side view of a single quadrant of the mounting system of FIG. 1, drawn in a somewhat larger scale.
Figure 4:
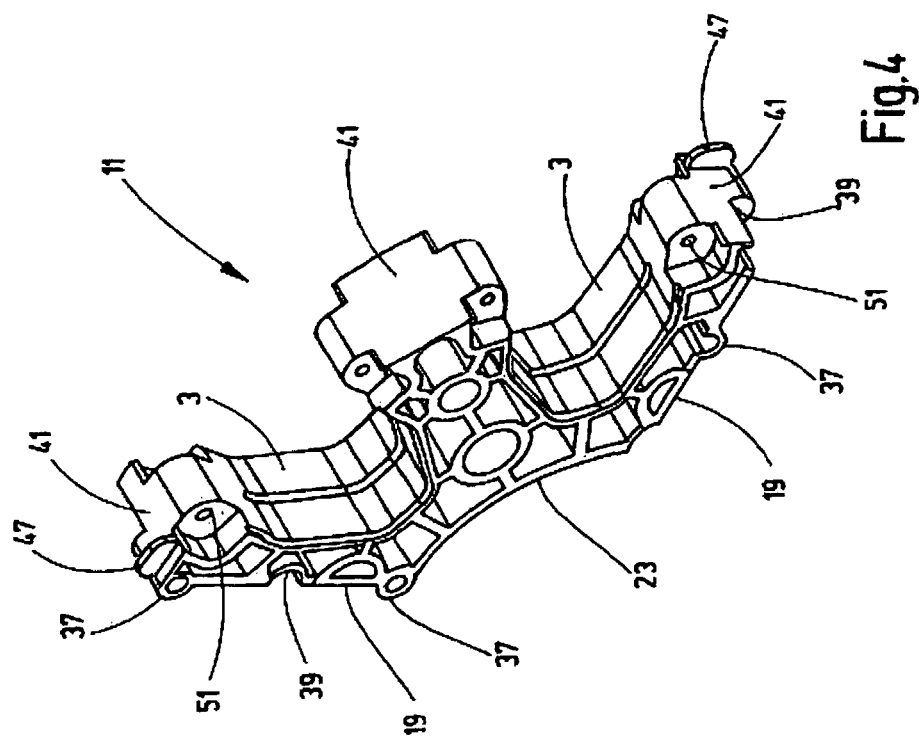
FIG. 4 is a perspective side view of the quadrant shown in FIG. 3.

FIGS. 2 to 4 show, in greater detail, the sectional elements 11 formed as carry-over parts, which can be combined into the star-shaped body 1. In the present example, four sectional elements 11 are provided, each of which have two strand passageways 3 in the form of trough-like recesses with an external opening 13. The sectional elements 11 are designed such that they are curved, as quadrants of what in the present case is a round star-shaped body 1. The receiving axes 15, defined by the receiving spaces 7, extend from the outer opening 13 to the inner end 17 of the strand passageways 3, see FIG. 3, and diverge to the outside of the sectional element 11. The sectional elements 11 are laterally defined by walls, which extend from radial planes. Those walls, the sectional elements 11 can be coupled to one another by junction points 21. The sectional elements 11 are delimited at the inner face thereof facing away from openings 13 of the strand passageways 3 by a wall 23. Wall 23 extends along a quarter-circle. FIG. 2 shows that two sectional elements 11 are connected at each of the junction points 21 into a pair comprising two quadrants. Both pairs are pivotably connected to one another at a junction point designed as a hinge joint 25.

Figure 9:
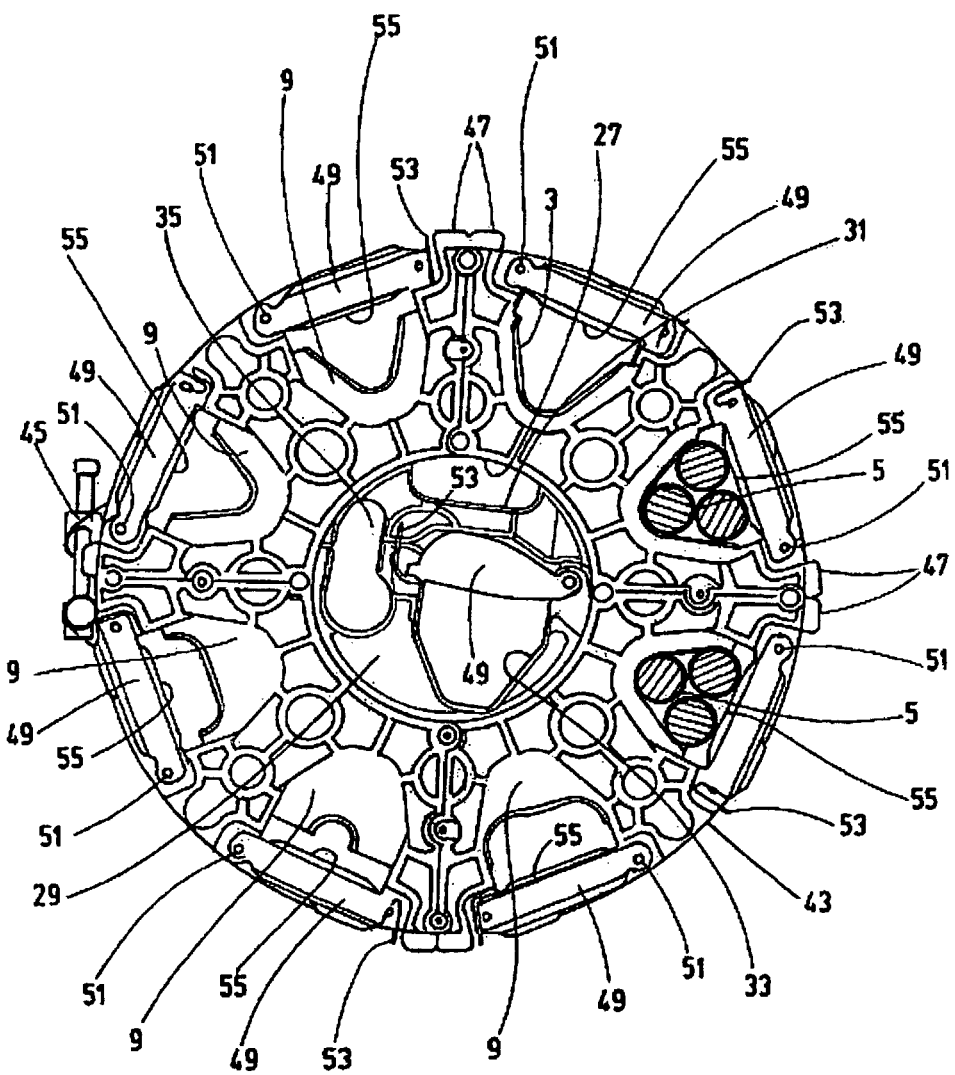
FIG. 9 is a side view of the embodiment corresponding to FIG. 1, wherein an inner insert is accommodated in the central opening of the star-shaped body.

When the pairs of quadrants are folded together from the spread pivoted position shown in FIG. 2 and connected into the closed star-shaped body 1, a closed central opening 27 is formed, in which an inner insert 29 can be accommodated and can be secured therein by folding together the pairs of quadrants. As shown in FIG. 9, inner insert 29 may form additional strand passageways 31, 33, 35 so that additional strand-like functional elements can be run through the central opening 27.

As can be seen in FIG. 4 in particular, the junction points 21 are designed such that projections 37 and depressions 39 are formed in the walls 19. Projections 37 and depressions 39 are disposed to alternate. In the installed state, a kind of toothing is then formed that can absorb the forces. The outer surfaces 41 adjoining the openings 13 of the strand passageways 3 have a curvature that corresponds to a circular arc for a tension band 43 enclosing the star-shaped body 1. The tension band 43 can be tightened by a turnbuckle 45. Tabs 47 that project from the surface 41 are located near the walls 19 for the lateral guidance of the tension band 43.

A holding member 49 is provided for the closure of each of the openings 13 of the strand passageways 3. Each holding member 49 is hinged with a joint fork (not shown in the drawing) at a pivot point 51 at the opening 13 of the appropriate strand passageway 3. These holding members 49 can then be pivoted out of a pivoting position releasing the opening 13, into the position shown in FIGS. 1 and 9, in which the holding members 49 close the strand passageways 3. These holding members 49 have latch tongues 53 (which are only partially numbered in FIGS. 1 and 9), with which the holding members 49 can be latched in the closed position for the pre-fixation of functional elements that are inserted into the strand passageways 3, before the tension band 43 is tightened over the top of the holding members 49. The holding members 49 have spring-loaded movable pressure members 55, which are only partially numbered in FIGS. 1 and 9 and exert a holding force on the functional elements such as cables or cable bundles 5 that are inserted in the strand passageways 3. A mounting system is thereby implemented, in which the respective star-shaped body 1 serves in the manner of a spacer for a loop of cables and/or lines forming loops, hanging out of the nacelle into the tower, thereby preventing the cables or lines from rubbing against one another during rotational movements. In addition, the cables or lines can be reliably guided and secured by the mounting system even within the segment-like tower structure, which represents a substantial facilitation in the installation of such towers.

FIGS. 5 and 6 show an embodiment in which the star-shaped body 1 is formed out of two identically designed sectional elements 12. Each sectional element 12 has two strand passageways 3 that, like the other components of these sectional elements 12, are designed in the same manner as the sectional elements 11 of the preceding example. The difference lies in the fact that, unlike the quadrants in the preceding example, the sectional elements 12 do not form a complete star when they are coupled to one another. Instead, free spaces 57 are formed between the sectional elements 12. The sectional elements 12 are connected at junction points 21 designed, as in the first embodiment, by screws that are screwed into the material of the sectional elements 12, as is also the case in the first embodiment. In the case of the second embodiment in FIGS. 5 and 6, only the junction points 21 that are adjacent to the inner wall 23 junction points 21 are used. Just as in the first embodiment, pivotable holding members 49 are hinged at the openings of the strand passageways 3, which holding members can be latched in the closed position. As in the first embodiment, a tension band 43 is passed over the top of the holding members 49.

Figure 7:
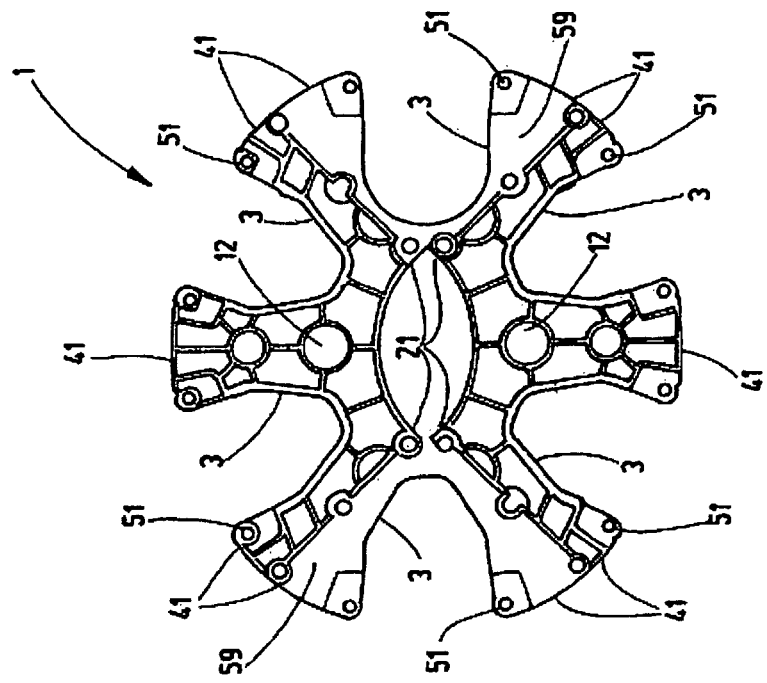
FIG. 7 is an exploded side view of the sectional elements of FIG. 5 and two additional sectional elements that can be attached between the sectional elements, drawn in a somewhat smaller scale than in FIG. 5, for forming a mounting system according to a third exemplary embodiment of the invention.
Figure 8:
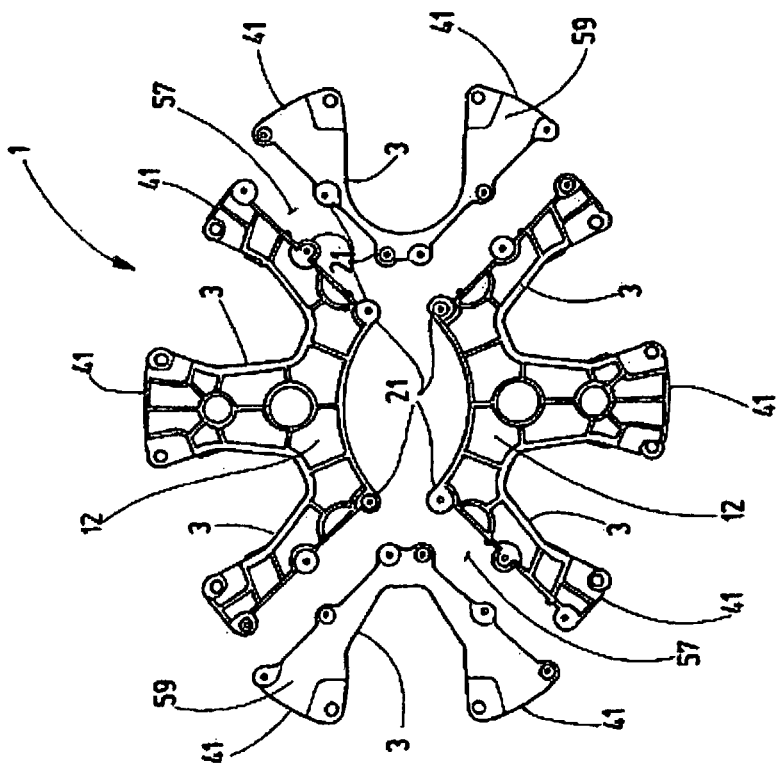
FIG. 8 is a side view of the sectional elements of FIG. 5 combined with the two additional sectional elements into a star-shaped body pursuant to the third embodiment of FIG. 7.

FIGS. 7 and 8 illustrate a further embodiment in the form of a further development of the example pursuant to FIGS. 5 and 6 described above. Additional elements 59 are provided for the formation of two additional strand passageways 3, which can be used in the free spaces 57 between the sectional elements 12 and, by the junction points 21, can be fixed thereto. Each of the additional elements 59 forms a strand passageway 3 and, together with the sectional elements 12, form a star-shaped body 1 having a slightly oval outer contour.

With the above mentioned sectional elements being designed as identical components, different configurations can therefore be produced at strand passageways, for example such as a configuration according to FIGS. 1 and 2 or such as a configuration according to FIGS. 5 and 6. If the above described sectional elements are designed such that they are smaller, so that these elements only cover an arc segment of 10° to 45°, preferably of approximately 30°, it will be possible to achieve a greater modular variance and to implement different fixing systems (not shown) with a plurality of sectional elements, in the manner of a modular system.

While various embodiments have been chosen to illustrate the invention, it will be understood by those skilled in the art that various changes and modifications can be made therein without departing from the scope of the invention as defined in the claims.

The invention claimed is:

1. A mounting system for strand-shaped functional elements, comprising:
a main body having a star-shaped body;
strand passageways formed by receiving spaces in said main body, said receiving spaces having openings for insertion of the functional elements and defining receiving axes extending from said openings to inner ends of said receiving spaces, said receiving axes of successive strand passageways diverging outwardly on said main body, said strand passageways being disposed on said main body along an imaginary curved line;
cover devices on said main body releasably closing said openings;
at least two separately formed sectional elements forming said main body, each of said sectional elements having respective ones of said strand passageways and being coupled to one other at least one junction point to form free points between adjacent ones of said sectional elements;
additional sectional elements having at least one additional strand passageway each accommodated in said free points; and
a hinge joint at said junction point pivotally coupling said sectional elements allowing relative pivotal movement of said sectional elements.

2. A mounting system according to claim 1 wherein a tension band encloses said cover devices and said main body.

3. A mounting system according to claim 1 wherein said at least two sectional elements are identically formed.

4. A mounting system according to claim 1 wherein each of said sectional elements are identically formed.

5. A mounting system according to claim 1 wherein said receiving spaces comprise trough-shaped recesses; and said cover devices comprise holding members at said openings and are latchable to the respective sectional element for prefixing the functional elements inserted into said stand passageways.

6. A mounting system for strand-shaped functional elements, comprising:
a main body;
strand passageways formed by receiving spaces in said main body, said receiving spaces having openings for insertion of the functional elements and defining receiving axes extending from said openings to inner ends of said receiving spaces, said receiving axes of successive strand passageways diverging outwardly on said main body;
cover devices on said main body releasably closing said openings;
at least two separately formed sectional elements forming said main body, each of said sectional elements having respective ones of said strand passageways and being coupled to one other at least one junction point, said at least two sectional elements including four sectional elements formed as quadrants combined in a star-shaped body, with said openings of said receiving spaces being located on a circular line extending along a periphery of said star-shaped body;
a hinge joint at said junction point pivotally coupling said sectional elements allowing relative pivotal movement of said sectional elements.

7. A mounting system according to claim 6 wherein said strand passageways are disposed on said main body along an imaginary curved line.

8. A mounting system according to claim 6 wherein said quadrants are coupled to one another at junctions along walls thereof, said walls extending in radial planes and laterally defining said receiving spaces.

9. A mounting system according to claim 6 wherein inner faces of said quadrants facing away from said openings of said strand passageways are delimited by inner walls extending along quarter-circles, said inner walls defining a central opening in said star-shaped body.

10. A mounting system according to claim 9 wherein an inner insert is accommodated in said central opening and has at least one additional strand passageway.

11. A mounting system according to claim 6 wherein said sectional elements are coupled to form free points between adjacent ones of said sectional elements; and
additional sectional elements having at least one additional strand passageway each are accommodated in said free points.

12. A mounting system for strand-shaped functional elements, comprising:
a main body;
strand passageways formed by receiving spaces in said main body, said receiving spaces having openings for insertion of the functional elements and defining receiving axes extending from said openings to inner ends of said receiving spaces, said receiving axes of successive strand passageways diverging outwardly on said main body,
cover devices on said main body releasably closing said openings; and
at least four separately formed sectional elements forming said main body, each of said sectional elements having respective ones of said strand passageways and being coupled to one other at junction points, said sectional elements being formed as quadrants combined in a star-shaped body, said openings of said receiving spaces being located on a circular line extending along a periphery of said star-shaped body.

13. A mounting system according to claim 12 wherein said strand passageways are disposed on said star-shaped body along an imaginary curved line.

14. A mounting system according to claim 12 wherein a tension band encloses said cover devices and said main body.

15. A mounting system according to claim 12 wherein at least two of said sectional elements are identically formed.

16. A mounting system according to claim 12 wherein each of said sectional elements are identically formed.

17. A mounting system according to claim 12 wherein said receiving spaces comprise trough-shaped recesses; and said cover devices comprise holding members at said openings and are latchable to the respective sectional element for prefixing the functional elements inserted into said strand passageways.

18. A mounting system according to claim 12 wherein said quadrants are coupled to one another at junctions along walls thereof, said walls extending in radial planes and laterally defining said receiving spaces.

19. A mounting system according to claim 12 wherein inner faces of said quadrants facing away from said openings of said strand passageways are delimited by inner walls extending along quarter-circles, said inner walls defining a central opening in said star-shaped body.

20. A mounting system according to claim 19 wherein an inner insert is accommodated in said central opening and has at least one additional strand passageway.

* * * * *